United States Patent
Yamamoto et al.

(10) Patent No.: US 7,584,864 B2
(45) Date of Patent: Sep. 8, 2009

(54) STRUCTURE OF CONTAINER HAVING BARRIER MATERIAL LAYER

(75) Inventors: Jyunji Yamamoto, Tochigi (JP); Tatsushi Tani, Tochigi (JP); Shouji Satoh, Tochigi (JP)

(73) Assignees: Yachiyo Kogyo Kabushiki Kaisya, Sayami-shi (JP); Honda Motor Co., Ltd., Tokyo (JP)

(*) Notice: Subject to any disclaimer, the term of this patent is extended or adjusted under 35 U.S.C. 154(b) by 436 days.

(21) Appl. No.: 11/518,892

(22) Filed: Sep. 12, 2006

(65) Prior Publication Data
US 2007/0065612 A1  Mar. 22, 2007

(30) Foreign Application Priority Data
Sep. 21, 2005  (JP)  ............................. 2005-273767

(51) Int. Cl.
*B65D 6/00*  (2006.01)
*B65D 8/00*  (2006.01)
(52) U.S. Cl. ...................... 220/4.13; 220/562; 428/35.7
(58) Field of Classification Search ....... 220/4.13–4.15, 220/562
See application file for complete search history.

(56) References Cited

U.S. PATENT DOCUMENTS

| | | | | |
|---|---|---|---|---|
| 6,737,132 | B1 * | 5/2004 | Michihata et al. | 428/35.7 |
| 7,208,210 | B2 * | 4/2007 | Michihata et al. | 428/36.7 |
| 7,211,307 | B2 * | 5/2007 | Potter et al. | 428/36.7 |

FOREIGN PATENT DOCUMENTS

JP  2005-82013  3/2005

* cited by examiner

*Primary Examiner*—Harry A Grosso
(74) *Attorney, Agent, or Firm*—Kratz, Quintos & Hanson, LLP

(57) ABSTRACT

The structure of a container having a barrier material layer, formed by blow molding, having a multilayer section structure including the barrier material layer and thermoplastic resin layers positioned inside and outside the barrier material layer, and fixed to a fixation object by bolt through a flange formed in a pinch-off portion, wherein in the flange a thin thickness portion is locally formed so that a multilayer section shape is compressed and a bolt fixing hole is drilled to insert the bolt in the thin thickness portion.

8 Claims, 2 Drawing Sheets

STRUCTURE OF CONTAINER HAVING BARRIER MATERIAL LAYER

BACKGROUND OF THE INVENTION

1. Field of the Invention

The present invention relates to a structure of a container having a barrier material layer such as a fuel tank mounted on a vehicle.

2. Description of the Related Art

Recently, in a fuel tank mounted on a vehicle prevails resin-made one by blow molding from a viewpoint of such a rust resistance and weight saving. In most cases, in order to suppress a permeation (permeation of an HC (Hydrocarbon) mainly contained in fuel) of fuel such as gasoline reserved inside, the resin fuel tank has a barrier material layer of which a wall portion consists of such an EVOH (Ethylene Vinyl alcohol copolymer), and in general, is often composed of the wall portion of a multilayer section structure having the barrier material layer and thermoplastic resin layers consisting of such PE (Polyethylene) formed inside and outside, sandwiching the barrier material layer. For example, in Japanese Patent Laid-Open Publication No. 2005-82013 is described a fuel tank of a multilayer section structure having an HC barrier material layer and a hot-plate-welding layer as a thermoplastic resin layer formed with sandwiching the HC barrier material layer.

As a conventional technology for fixing a resin fuel tank is cited a method of hanging a band across a lower surface of the tank and applying a load to its whole vehicle body in a case of fixing the tank on a floor lower surface under a vehicle cabin. However, because the band member is separately required, the method connects to a problem that a number of parts and a weight increase; moreover, an arrangement space of the band member must be ensured as a space around the tank.

On the contrary, if adopting a structure of integrally forming a flange at an outer face side of a fuel tank in a pinch-off portion of a blow molding mold and drilling a bolt fixing hole in the flange, a fixation member such as a band member is not required, the tank can be fixed on its vehicle body only with a bolt through the flange, and the problem is expected to be eliminated. However, in the structure an inner peripheral face of the bolt fixing hole penetrating the flange results in being exposed outside, that is, a part of a thermoplastic resin layer formed between barrier material layers results in being exposed, and there is a problem that permeable fuel leaks outside from the exposed thermoplastic resin layer.

The present invention is performed to solve such the problem, and in a structure of forming a flange in a container such as a fuel tank in a pinch-off portion of a blow molding mold and drilling a bolt fixing hole at the flange, the invention intends to provide a structure of the container of being able to reduce a discharge amount of permeable fuel from the hole by simple configuration

SUMMARY OF THE INVENTION

In order to solve the problem, the present invention is a structure of a container having a barrier material layer, formed by blow molding, having a multilayer section structure including a barrier material layer and thermoplastic resin layers positioned inside and outside the barrier material layer, and fixed to a fixation object by bolt through a flange formed in a pinch-off portion, wherein in the flange a thin thickness portion is locally formed so that a multilayer section shape is compressed and a bolt fixing hole is drilled to insert the bolt in the thin thickness portion.

In accordance with the structure, because an exposed face of the thermoplastic resin layer formed inside the barrier material layer is formed in the thin thickness portion, a surface area of the exposed face of the thermoplastic resin layer becomes smaller, compared to a structure of drilling a bolt fixing hole in a thick thickness portion as it is. Thereby it becomes possible to reduce a discharge amount of permeable fuel per unit time leaking from the exposed face of the thermoplastic resin layer.

Furthermore, the present invention is a structure of a container having a barrier material layer, wherein the thin thickness portion is formed by blow molding mold in blow molding.

In accordance with the structure, because the thin thickness portion can be simultaneously formed in blow molding a container, a productivity of the container is improved, compared to a case of taking out the container from a blow molding mold, and then separately compressing and processing the thin thickness portion.

Furthermore, the present invention is a structure of a container having a barrier material layer, wherein the container is a fuel tank attached to a vehicle body, a barrier material is composed of an EVOH, and an interval size of the barrier material layer in the thin thickness portion is set not more than 0.5 mm.

As a test result, in a case that a diameter of a bolt fixing hole is made about 8 mm for use in a bolt of thread diameter M8, if the interval size is set not more than 0.5 mm, it is proved to be able to effectively suppress a discharge amount of permeable fuel. Because a bolt used for fixing a vehicle fuel tank is normally not less than M8 from a point of a fixation strength, if the interval size is made not more than 0.5 mm of a standard value of an M8 bolt and a barrier material is composed of the EVOH in the vehicle fuel tank, it is possible to effectively suppress the discharge amount of the permeable fuel.

BEST MODE FOR CARRYING OUT THE INVENTION

Here will be described a case that a container of an application object of an embodiment of the present invention is a fuel tank. A fuel tank 1 is formed by blow molding, and a flat plate flange 2 is formed along a horizontal direction by a pinch-off portion of a mold at a part of an outer face of a sidewall portion of the tank 1.

Figure 1:
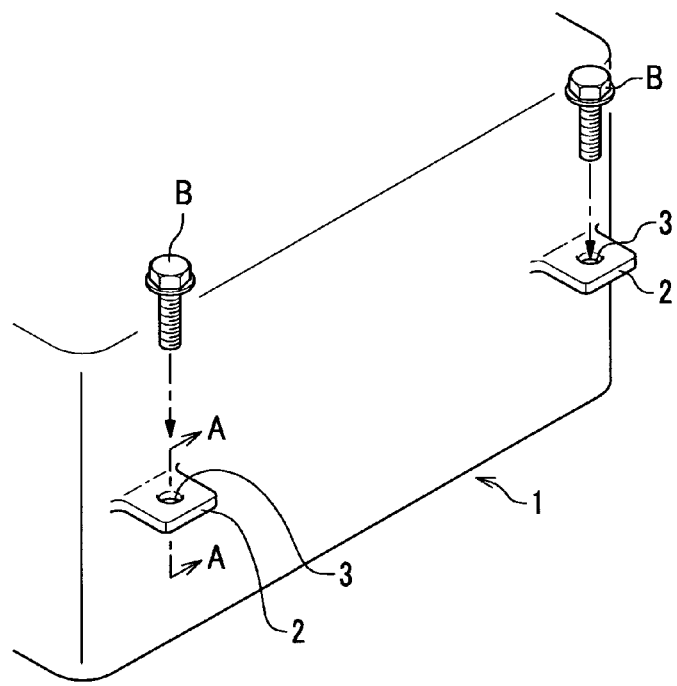
FIG. 1 is a partial appearance perspective view of a fuel tank an embodiment of the present invention.
Figure 2:
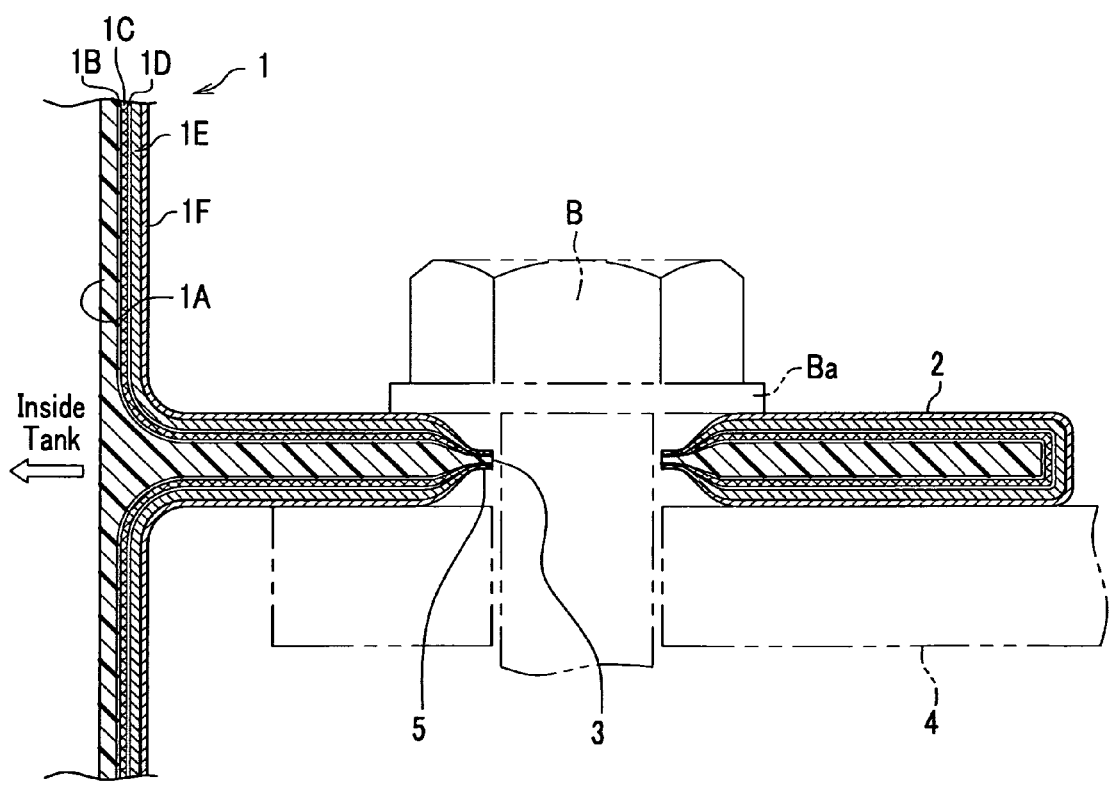
FIG. 2 is a section view A-A in FIG. 1.

A layer configuration of a wall portion of the fuel tank 1 is in order from an inside of the tank 1, as shown in FIG. 2, a thermoplastic resin layer (called an inside thermoplastic resin layer 1A), an adhesion layer (called an adhesion inner layer 1B), a barrier material layer 1C, an adhesion layer (called an adhesion outer layer 1D), a regeneration layer 1E, and a thermoplastic resin layer (called an outside thermoplastic resin layer 1F). Accordingly, a layer configuration of the flange 2 formed by the above multilayer parison becomes each pair of the adhesion inner layers 1B, the barrier material layers 1C, the adhesion outer layers 1D, the regeneration layers 1E, and the outside thermoplastic resin layers 1F sandwiching the inside thermoplastic resin layer 1A.

The inside thermoplastic resin layer 1A and the outside thermoplastic resin layer 1F are mutually composed of a same material, and for example, are formed of PE excellent in such a thermofusible property and a formability. The adhesion inner layer 1B and the adhesion outer layer 1D are mutually composed of a same material, and are formed, for example, of an adhesive resin such as ADMER (registered trademark) manufactured by Mitsui Chemicals, Inc. The barrier material layer 1C is formed, for example, of an EVOH excellent in non-permeability of hydrocarbons. The regeneration layer 1E is formed of a regeneration material obtained by recovering such a burr in blow molding the fuel tank 1.

Near a center portion of the flange 2 is drilled a bolt fixing hole 3 for inserting a bolt B, and as shown in FIG. 2, the fuel tank 1 is fastened and fixed to a bracket 4 (fixation object) at a vehicle body side by the bolt B and a nut not shown through the flange 2. In such the attachment structure of the fuel tank 1, as described in the problem to be solved by the present invention, the inside thermoplastic resin layer 1A (strictly speaking in the embodiment, the thermoplastic resin layer 1A and the adhesion inner layers 1B) results in being exposed outside on an inner peripheral face of the bolt fixing hole 3, and permeable fuel results in leaking outside from exposed faces of the layer 1A and the layers 1B.

The present invention is mainly characterized in that: in the flange 2 the thin thickness portion 5 is locally formed so that the multilayer section shape is compressed; and the bolt fixing hole 3 is drilled in the portion 5. Because the present invention makes it a requirement that the thin thickness portion 5 is formed so that the multilayer section shape of the flange 2 is compressed, for example, a thin thickness portion formed by cutting process such as a counter boring process is not included in the invention. The layer configuration of the thin thickness portion 5 in the embodiment is, of course as described before, composed of the inside thermoplastic resin layer 1A at center and each pair of the adhesion inner layers 1B, the barrier material layers 1C, the adhesion outer layers 1D, the regeneration layers 1E, and the outside thermoplastic resin layers 1F.

The thin thickness portion 5 in the embodiment is formed into a circle near the center portion of the flange 2. Furthermore, in FIG. 2 a formed position of the thin thickness portion 5 with respect to a thickness direction of the flange 2 is shown as being existing at a thickness center portion of the flange 2. The bolt fixing hole 3 is drilled at a center portion of the thin thickness portion 5, and when the bolt B is inserted in the hole 3, a lower edge (lower edge of a washer portion Ba in the embodiment) of a head portion of the bolt B contacts a thick thickness portion around the portion 5.

A method of forming the thin thickness portion 5 is roughly classified into: a case of forming it by blow molding mold in blow-molding the fuel tank 1 (that is, a case of forming a convex portion for the portion 5 in a pinch-off portion of the mold); and a case of taking out the tank 1 from the mold, and then forming the portion 5 by compression process separately prepared. In the latter case, because the compression process is separately required and the processing is performed upon a material being cooled and solidified by outside air, there is such a problem that a larger compression load is required; in this point the method of forming the thin thickness portion 5 according to the former is advantageous.

Furthermore, a method of drilling the bolt fixing hole 3 is also roughly classified into: a case of forming it by blow molding mold in blow-molding the fuel tank 1 (that is, a case of providing a pin for the hole 3 in the pinch-off portion of the mold); and a case of taking out the tank 1 from the mold, and then forming the hole 3 by a process of separately prepared punching processing and the like. In the former its productivity is further improved by doing without separately providing the process.

Thus in the flange 2, configuring to locally form the thin thickness portion 5 so that the multi section shape is compressed and to drill the bolt fixing hole 3 for inserting the bolt B in the portion 5, the exposed faces of the inside thermoplastic resin layer 1A and the adhesion inner layers 1B result in being formed in the portion 5; therefore, it is possible to make surface areas of the exposed faces of the layer 1A and the layers 1B to be smaller, compared to a structure of drilling the hole 3 in the thick thickness portion of the flange 2 as it is. Thereby it becomes possible to reduce a discharge amount of permeable fuel per unit time leaking from the exposed faces of the inside thermoplastic resin layer 1A and the adhesion inner layers 1B.

Figure 3:
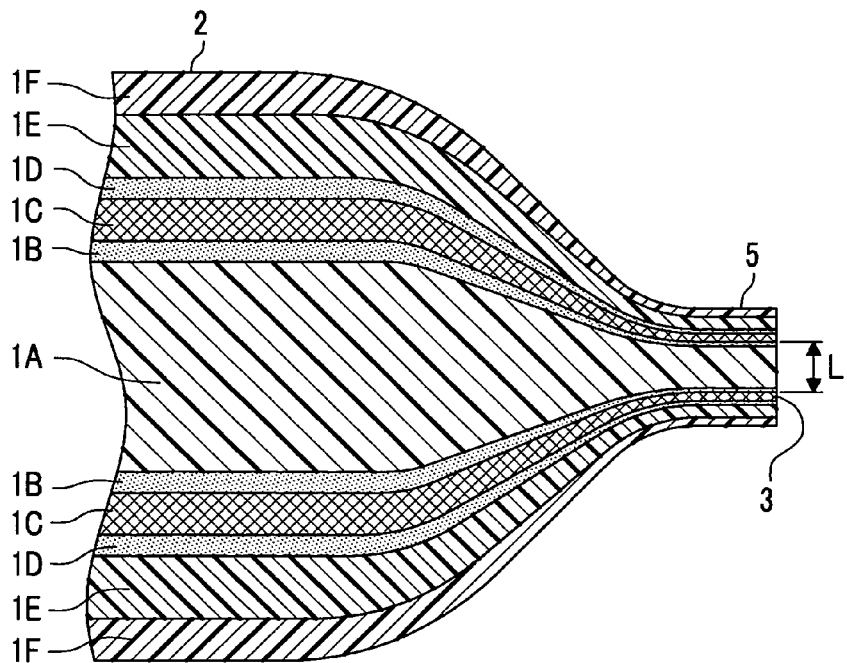
FIG. 3 is a main portion enlarged drawing of FIG. 2.

In order to make the surface areas of the exposed faces of the inside thermoplastic resin layer 1A and the adhesion inner layers 1B to be smaller with respect to a predetermined diameter of the bolt fixing hole 3, of course, it suffices to set an interval size L between each of the layers 1B in FIG. 3 smaller. As a test result, in a case that a diameter of the bolt fixing hole 3 is made about 8 mm for use in the bolt B of thread diameter M8, if the interval size L is set not more than 0.5 mm, it is proved to be able to effectively suppress the discharge amount of permeable fuel.

To be more precise, when providing flanges 2 at four places, respectively drilling bolt fixing holes 3 of an about 8 mm diameter, and making each interval size L 0.5 mm, a total discharge amount of permeable fuel from the four bolt fixing holes 3 became 0.91 mg (per day). The value easily satisfies a regulation value of a fuel evaporation gas of the California Air Resources Board (CARB). Because the bolt B used for fixing the vehicle fuel tank 1 is normally not less than M8 from a point of a fixation strength, if the interval size L is made not more than 0.5 mm of a standard value of the bolt B of M8 and a barrier material is composed of the EVOH in the tank 1, it becomes possible to effectively suppress the discharge amount of the permeable fuel.

Figure 4:
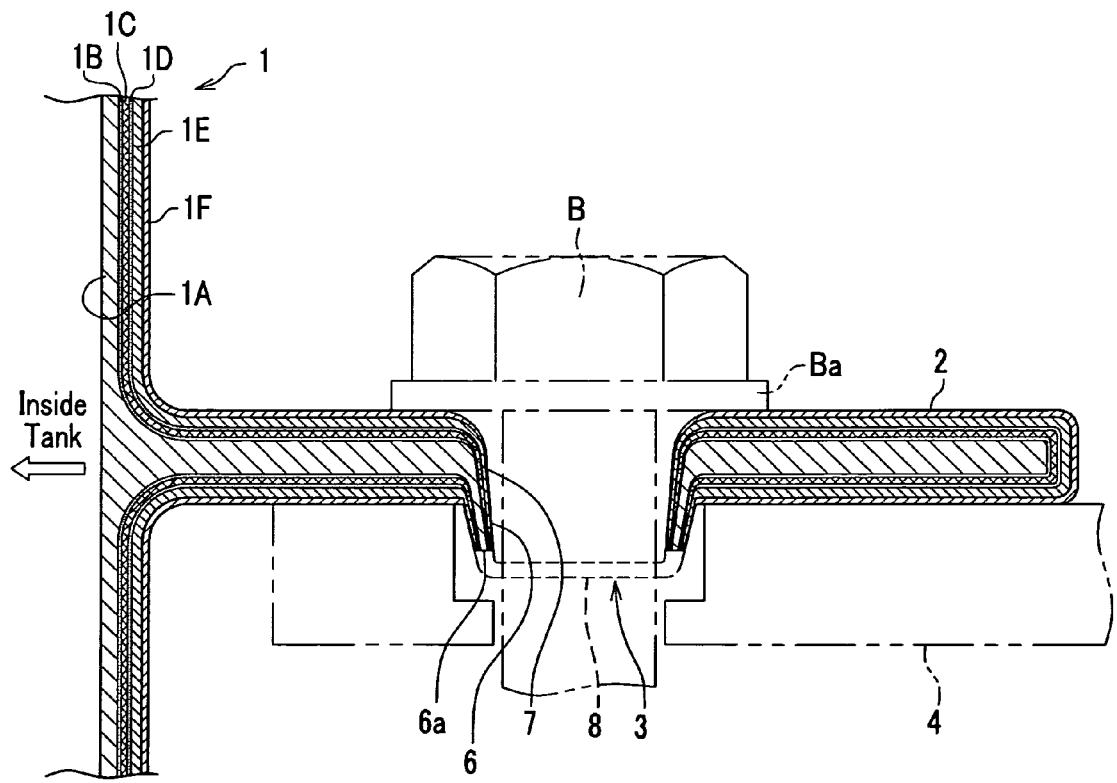
FIG. 4 is a side section illustration drawing showing a shape variation example of a thin thickness portion of the present invention.

Thus the best mode with respect to the present invention has been described. In the present invention, specifically the shape of the thin thickness portion 5 is changeable in design as needed. For example, FIG. 4 is a side section illustration drawing showing a shape variation example of the thin thickness portion 5; the variation example also satisfies the requirement that: in the flange 2 the thin thickness portion 5 is locally formed so that the multilayer shape is compressed; and the bolt fixing hole 3 is drilled in the portion 5. The variation example shows a structure of forming a concave portion 7 at one face (upper face in FIG. 4) side of the flange 2 so that a protruding wall 6 is formed in a state of the multilayer section shape being compressed from the other face (lower face in FIG. 4) side, in this case the protruding wall 6 configures the thin thickness portion 5. In addition, also forming the protruding wall 6 is roughly classified into: a case of forming it by blow molding mold in blow-molding the fuel tank 1; and a case of taking out the tank 1 from the mold, and then forming the wall 6 by a process of separately prepared compression processing.

Then the bolt fixing hole 3 is formed by cutting and removing a bottom portion 8 (shown in a dotted line of FIG. 4) of the concave portion 7 with such a cutting process. In the structure thus described, because the surface areas of the exposed faces of the inside thermoplastic resin layer 1A and the adhesion inner layers 1B become smaller, it is possible to reduce the discharge amount of permeable fuel per unit time.

Furthermore, the container of the present invention is not limited to a fuel tank mounted on a vehicle: If the container has a structure formed by blow molding; having a multilayer section structure including a barrier material layer for suppressing a permeation of a reserved substance inside, and thermoplastic resin layers positioned inside and outside the barrier material layer; and attached to a fixation object by bolt through a flange formed in a pinch-off portion, it is applicable to any technical field such as reserving chemicals.

What is claimed is:

1. A structure of a container formed by blow molding, the container comprising:
    a barrier material layer;
    thermoplastic resin layers positioned inside and outside the barrier material layer; and
    a multilayer section structure including the barrier material layer and the thermoplastic resin layer,
    wherein the container is fixed to a fixation object by a bolt through a flange formed in a pinch-off portion, and
    wherein in the flange a thin thickness portion is locally formed so that a multilayer section shape is compressed and a bolt fixing hole is drilled to insert the bolt in the thin thickness portion.

2. The structure of the container according to claim 1, wherein the thin thickness portion is formed by blow molding mold in blow molding.

3. The structure of the container according to claim 1,
    wherein the container is a fuel tank attached to a vehicle body, the barrier material of the barrier layer is composed of an EVOH (Ethylene Vinyl alcohol copolymer), the barrier material layer having a first barrier material layer and a second barrier material layer in the flange, and an interval size between the first barrier material layer and the second barrier material layer in the thin thickness portion is set to not more than 0.5 mm.

4. The structure of the container according to claim 2,
    wherein the container is a fuel tank attached to a vehicle body, the barrier material of the barrier layer is composed of an EVOH(Ethylene Vinyl alcohol copolymer), the barrier material layer having a first barrier material and a second barrier material layer in the flange, and an interval size between the first barrier material layer and the second barrier material layer in the thin thickness portion is set to not more than 0.5 mm.

5. The structure of the container according to claim 3,
    the thermoplastic resin layers having an inside thermoplastic resin layer positioned inside the barrier material layer and an outside thermoplastic resin layer positioned ou side the barrier material layer;
    the first barrier material layer and the second barrier material layer sandwiching the inside thermoplastic resin layer.

6. The structure of the container according to claim 4,
    the thermoplastic resin layers having an inside thermoplastic resin layer positioned inside the barrier material layer and an outside thermoplastic resin layer positioned outside the barrier material layer;
    the first barrier material layer and the second barrier material layer sandwiching the inside thermoplastic resin layer.

7. The structure of the container according to claim 5,
    the flange having the outside two thermoplastic resin layers sandwiching the inside thermoplastic resin layer.

8. The structure of the container according to claim 5,
    the flange having the outside two thermoplastic resin layers sandwiching the inside thermoplastic resin layer.

* * * * *

UNITED STATES PATENT AND TRADEMARK OFFICE
CERTIFICATE OF CORRECTION

PATENT NO. : 7,584,864 B2
APPLICATION NO. : 11/518892
DATED : September 8, 2009
INVENTOR(S) : Yamamoto et al.

It is certified that error appears in the above-identified patent and that said Letters Patent is hereby corrected as shown below:

On the Title Page, please correct Item (73) as follows:

-- (73) Yachiyo Kogyo Kabushiki Kaisya
 Sayama-shi, Japan --

Signed and Sealed this

Thirtieth Day of March, 2010

David J. Kappos
*Director of the United States Patent and Trademark Office*